United States Patent
Thomas et al.

(10) Patent No.: US 10,581,088 B2
(45) Date of Patent: Mar. 3, 2020

(54) FUEL CELL GAS DIFFUSION LAYER MADE UP OF A CARBON SUBSTRATE GRAFTED WITH AN AROMATIC GROUPING

(71) Applicant: Commissariat A L'Energie Atomique Et Aux Energies Alternatives, Paris (FR)

(72) Inventors: Yohann Thomas, Grenoble (FR); Anass Benayad, Grenoble (FR); Arnaud Morin, Corenc (FR); Joël Pauchet, Saint Martin d'Uriage (FR); Maxime Schroder, Buironfosse (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 116 days.

(21) Appl. No.: 15/651,188

(22) Filed: Jul. 17, 2017

(65) Prior Publication Data
US 2017/0352893 A1    Dec. 7, 2017

Related U.S. Application Data

(63) Continuation of application No. PCT/FR2016/050061, filed on Jan. 14, 2016.

(30) Foreign Application Priority Data

Jan. 22, 2015  (FR) ...................... 15 50497

(51) Int. Cl.
*H01M 8/0234* (2016.01)
*C25D 9/02* (2006.01)
*H01M 8/1018* (2016.01)

(52) U.S. Cl.
CPC ............ *H01M 8/0234* (2013.01); *C25D 9/02* (2013.01); *H01M 2008/1095* (2013.01)

(58) Field of Classification Search
None
See application file for complete search history.

(56) References Cited

U.S. PATENT DOCUMENTS 6,399,202 B1   6/2002   Yu et al.
2005/0233183 A1   10/2005   Hampden-Smith et al.

OTHER PUBLICATIONS

Servinis et al, A novel approach to functionalise pristine unsized carbon fibre using in situ generated diazonium species to enhance interfacial shear strength, J. Mater. Chem. A. 2015, 3, 3360 (Year: 2015).*

(Continued)

*Primary Examiner* — Scott J. Chmielecki
(74) *Attorney, Agent, or Firm* — Burr & Brown, PLLC (57) ABSTRACT

The present invention relates to a gas diffusion layer for a fuel cell, made of a carbon substrate grafted with at least one aromatic group having formula (II):

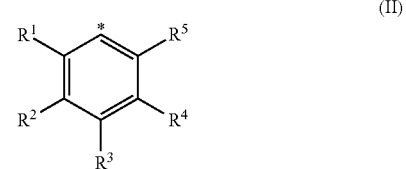

(II)

wherein: the asterisk * designates a carbon atom with no hydrogen and no $R^i$ group, with i=1 to 5, and covalently bonded to the carbon substrate; at least two of the $R^1$, $R^2$, $R^3$, $R^4$, and $R^5$ groups are different from a hydrogen atom; at least two of the $R^1$, $R^2$, $R^3$, $R^4$, and $R^5$ groups are hydrophobic groups or hydrophilic groups or a hydrophobic group and a hydrophilic group.

9 Claims, 4 Drawing Sheets (56) References Cited

OTHER PUBLICATIONS

Catherine Combellas, et al., "Steric Effects in the Reaction of Aryl Radicals on Surfaces," *Langmuir,* vol. 25, No. 1, Jan. 6, 2009, pp. 286-293.
L. Servinis, et al., "A Novel Approach to Functionalise Pristine Unsized Carbon Fibre Using In Situ Generated Diazonium Species to Enhance Interfacial Shear Strength," *Journal of Materials Chemistry A,* vol. 3, No. 7, Nov. 25, 2014, pp. 3360-3371.
International Search Report and Written Opinion (Application No. PCT/FR2016/050061) dated Apr. 8, 2016.

\* cited by examiner

Fig. 1

Bonding energy (ev)

FUEL CELL GAS DIFFUSION LAYER MADE UP OF A CARBON SUBSTRATE GRAFTED WITH AN AROMATIC GROUPING

BACKGROUND OF THE INVENTION

The present invention relates to a gas diffusion layer (GDL) for a fuel cell, made of a carbon substrate grafted with at least one aromatic group. The carbon substrate can thus be grafted with hydrophobic and/or hydrophilic groups.

The field of use of the present invention particularly relates to the storage of energy in chemical form, particularly in proton exchange membrane fuel cells.

FIELD OF THE INVENTION

A PEMFC ("proton exchange membrane fuel cell") generally comprises at least one membrane-electrode assembly where the membrane is positioned between the cathode and the anode.

Each of the electrodes is generally associated with a gas diffusion layer or GDL. Each GDL is in contact with a current collector which enables to convey the electrons via a circuit external to the fuel cell.

Thus, a fuel cell generally comprises the following stack:
first current collector;
GDL;
first electrode;
membrane;
second electrode with a sign opposite to that of the first electrode;
GDL;
second current collector.

Typically, a GDL is porous to allow the flowing of the reagents and of the reaction products. It is electrically and thermally conductive, corrosion-resistant, and has mechanical resistance properties compatible with the pressure of assembly of a fuel cell.

Generally, a GDL has hydrophobic properties. This is also true for other materials used to design a fuel cell, such as the diffusion layer, the MPL ("MicroPorous Layer"), or the active layer (catalytic layer).

In a GDL, hydrophobic properties are necessary to drain off the water generated at the cathode. Indeed, if the water is not drained off the cathode may drown and prevent the reactant gas from arriving. The presence of too much water may thus decrease the performance of the fuel cell.

A technique enabling to improve the hydrophobic properties of the GDL or of the MPL particularly comprises a treatment with an emulsion containing PTFE (polytetrafluoroethylene).

However, this method has the following disadvantages:
decrease in the porosity of the GDL, which may adversely affect the gas or liquid transport mechanisms within the fuel cell;
increase of the contact resistivity according to the quantity of PTFE;
degradation of the PTFE in the fuel cell operating conditions;
lack of homogeneity of the PTFE deposit, particularly across the GDL. The carbon fibers or the graphite are generally not integrally covered with PTFE.

The Applicant has developed a method enabling to solve these technical issues, by grafting on the carbon a molecule having hydrophobic and/or hydrophilic properties. Such a treatment is particularly adapted to gas diffusion layers present in fuel cells.

SUMMARY OF THE INVENTION

The principle of the invention is based on the grafting of diazonium salts (organic compound comprising the $N_2^+$ group) on a carbon surface, which is advantageously intended to be used as a gas diffusion layer (GDL) of a fuel cell.

More particularly, the present invention relates to a gas diffusion layer (GDL) for a fuel cell, made of a carbon substrate grafted with at least one aromatic group having formula (II):

(II)

wherein:
the asterisk * designates a carbon atom with no hydrogen and no $R^i$ group, with i=1 to 5, and covalently bonded to the carbon substrate;
at least two of the $R^1$, $R^2$, $R^3$, $R^4$, and $R^5$ groups are different from a hydrogen atom;
at least two of the $R^1$, $R^2$, $R^3$, $R^4$, and $R^5$ groups are hydrophobic groups or hydrophilic groups or a hydrophobic group and a hydrophilic group.

This gas diffusion layer is advantageously obtained by a carbon substrate grafting method comprising the steps of:
a) preparation of a solution containing at least one diazonium salt having foiniula (I)

(I)

wherein:
at least two of the $R^1$, $R^2$, $R^3$, $R^4$, and $R^5$ groups are different from a hydrogen atom;
at least two of the $R^1$, $R^2$, $R^3$, $R^4$, and $R^5$ groups are hydrophobic groups or hydrophilic groups or a hydrophobic group and a hydrophilic group;
b) placing into contact a carbon substrate with the diazonium salt solution;
c) grafting the carbon substrate by reduction of the diazonium salt;
d) obtaining a carbon substrate grafted with the aromatic group having formula $(C_6R^1R^2R^3R^4R^5)$.

The X-counter-ion may in particular be a halogenide.

A hydrophobic group or compound is generally characterized by its lack of affinity for water. Generally, it cannot create hydrogen bonds with water molecules.

Conversely, a hydrophilic compound or group is capable of interacting with water, particularly by the forming of hydrogen bonds.

It is well within the abilities of those skilled in the art to distinguish these two types of compounds or groups.

Step a)

Step a) comprises preparing a solution of diazonium salt having formula (I).

This salt comprises the $(C_6R^1R^2R^3R^4R^5)$ aromatic group corresponding to formula (II) where the asterisk * designates a carbon atom with no hydrogen and no $R^i$ group (i=1 to 5) and covalently bonded to the carbon substrate:

(II)

Advantageously, the $R^1$, $R^2$, $R^3$, $R^4$, and $R^5$ groups are selected independently from one another from the group comprising:

$C(=O)O^-Y^+$; $SO_3^-Y^+$; $CH_2-SO_3^-Y^+$; $NR_3^+X^-$; OH; $PO_3H^-Y^+$;

H; F; $C_nF_{2n+1}$; $C_nH_{2n+1}$;

$NO_2$; $-O-CH_2-O-$; imidazole groups; and derivatives of imidazole groups; with Y=H, Na, K, Li, $NR'_4$; X=F, Cl, Br, I;

n being an integer advantageously in the range from 1 to 10; $R=C_mH_{2m+1}$; R'=H, $C_mH_{2m+1}$ and mixtures thereof, m being an integer advantageously in the range from 1 to 10.

According to a specific embodiment, groups $R^i$(i=1 to 5) may in particular correspond to one of the following combinations:

$R^1=R^3=R^5=H$ and $R^2=R^4=CF_3$:
$R^1=R^4=R^5=H$ and $R^2+R^3=-O-CH_2-O-$;
$R^1=R^3=R^5=H$; $R^2=CF_3$ and $R^4=C(=O)O^-Y^+$; and
$R^1=R^3=R^5=H$; $R^1=SO_3^-Y^+$ and $R^4=CF_3$.

Advantageously, two of the $R^i$ groups (i=1 to 5) are $CF_3$ groups.

The $CF_3$ group is a function close to that of PTFE (polytetrafluoroethylene), which is currently used to given hydrophobic properties to a substrate.

The $(C_6R^1R^2R^3R^4R^5)$ aromatic group having formula (II) is particularly attractive given that it enables to generate an electronic bridge between the carbon substrate and the $R_i$ group (i=1 to 5).

According to a specific embodiment, the diazonium salt used at step a) may be prepared in the presence of at least one nitrosating agent and of an amine having formula (III):

(III)

Advantageously, the quantity of nitrosating agent enabling to obtain the diazonium salt having formula (I) from the amine having formula (III) amounts to from 1 to 10 molar equivalents with respect to the number of moles of the amine, more advantageously from 1 to 5.

The nitrosating agent used to prepare the diazonium salt from the amine having formula (III) advantageously is sodium nitrite $NaNO_2$ or nitrous acid $HNO_2$. It preferably is $NaNO_2$.

The diazonium salt is generally formed in the presence of an acid. The acid advantageously is sulphuric acid $H_2SO_4$; phosphoric acid $H_3PO_4$; or hypophosphorous acid $H_3PO_2$.

This reaction is advantageously carried out in an aqueous solution, at a temperature advantageously in the range from 15 to 30° C. The pH of this solution is advantageously in the range from 0 to 2, more advantageously from 0 to 1.

Once the diazonium salt has been prepared, it can be isolated and then used to prepare the solution of step a).

According to another embodiment, the diazonium salt is prepared in situ in the solution involved at step a).

The grafting solution prepared at step a) is advantageously an aqueous solution. It has a pH that may be in the range from 0 to 2, advantageously from 0 to 1.

Generally, an aqueous solution is a solution having water as its main solvent, and preferably only water.

Once the diazonium salt solution has been prepared, it may be used at step b).

Thus, and according to a specific embodiment, the grafting method may comprise the steps of:

a) nitrosating a primary aromatic amine having formula (III) in an acid and aqueous medium to obtain a diazonium salt having formula (I);

b) placing into contact a carbon substrate with this solution containing the diazonium salt;

c) electrochemically reducing the diazonium ions.

Step b)

Step b) comprises placing into contact a carbon substrate with the diazonium salt solution.

The carbon substrate is advantageously porous. It generally has two main surfaces.

Typically, the carbon substrate may appear in the form of a material selected from the group comprising: carbon nonwoven; carbon fabric; carbon felt; carbon cloth; carbon paper; graphite; carbon black; carbon nanotubes; and graphene.

The carbon substrate has a thickness advantageously in the range from 100 to 500 micrometers, particularly for an application as a gas diffusion layer.

It is preferably made of carbon fibers. These fibers have a diameter advantageously in the range from 5 to 15 micrometers.

Advantageously, it is a carbon fiber nonwoven.

According to a specific embodiment, during the placing into contact of step b), the substrate may be immersed in the diazonium salt solution. Thus, the substrate may be thoroughly impregnated and thus thoroughly grafted.

According to another embodiment particularly adapted to the case where the substrate has two main surfaces, during the placing into contact of step b), the substrate may be treated by deposition of the solution on at least one of its surfaces. Thus, each main surface of the substrate can be specifically treated. The quantity and the nature of the group having formula (II) can thus be adapted according to the substrate surface, which may in particular be in contact with a current collector or with an electrode (active layer or microporous layer, for example).

According to another specific embodiment, the carbon substrate may be oxidized prior to its placing into contact with the diazonium salt solution.

This oxidation particularly enables to increase the hydrophilic character of the carbon substrate, prior to the grafting of step c). Thus, the contact of the diazonium salt and of the carbon substrate is favored, which improves the grafting rate.

Step c)

Step c) of the method enables to graft a carbon substrate with the group having formula (II), by reduction of the diazonium salt.

The reduction of the diazonium salt may be performed chemically or electrochemically.

Electrochemical reduction (electroreduction) generally enables to better control the grafting as compared with chemical reduction.

The electrochemical reduction of the diazonium ions enables to accurately control this reaction and the grafting kinetics. Indeed, by performing cyclic voltammetries, it is possible to follow this reaction since a peak corresponding to the reduction potential of the diazonium ions during the first cycle, followed by a decrease of the current indicating a progressive covering of the surface with the grafted molecules at the next cycles, can be observed.

Electrochemical reduction thus enables to predetermine and to optimize the grafting rate.

Advantageously, the electroreduction of the diazonium salt is performed by electrochemical generation of one electron per diazonium salt molecule.

Advantageously, the chemical reduction of the diazonium salt may be performed by placing into contact the carbon substrate with the different reagents (nitrosating agent such as $NaNO_2$, amine) in an acid aqueous solution. Steps a), b), and c) can thus be combined.

According to a specific embodiment, the chemical reduction may be facilitated by the presence of a reducing agent, particularly a compound capable of being selected from hydrophosphorous acid $H_3PO_2$, ferrocene $Fe(C_5H_5)_2$, and iron powders.

The chemical reduction of the diazonium salt may also be facilitated by photochemical irradiation, that is, by exposure to an electromagnetic radiation.

Once the grafting has been performed, the carbon substrate is advantageously rinsed, advantageously with de-ionized water.

After the grafting, and after the rinsing, if present, the carbon substrate is advantageously dried.

Step d)

Due to its properties of electron conductivity (carbon), porosity (carbon fibers), and hydrophobicity (grafting of the group having formula (II) ($C_6R^1R^2R^3R^4R^5$)), the grafted carbon substrate is particularly adapted for a use as a diffusion layer in a fuel cell, in particular.

As already indicated, this method enables to adjust the properties of the grafted substrate according to the nature and to the quantity of grafted groups having formula (II) ($C_6R^1R^2R^3R^4R^5$).

Thus, according to a specific embodiment, the carbon substrate may have two main surfaces which are each submitted to a different grafting. In other words, a main surface may be grafted with a hydrophobic group $R_i$ (i=1 to 5), while the other main surface may be grafted with a different hydrophobic group or with a hydrophilic group. It then is a mixed grafting: hydrophobic or hydrophilic according to the main surface of the substrate.

According to another specific embodiment, steps b) and c) may comprise:

grafting a first main surface of the substrate with a first solution of a first diazonium salt having formula (I); and then grafting a second main surface of the substrate with a second solution of a second diazonium salt having formula (I), the first and the second diazonium salts being different from each other.

Due to the substituents of the group having formula (II), this method enables to control the quantity of grafted groups and thus the hydrophobicity of the carbon substrate. Indeed, it is possible to select the quantity of groups which are grafted and their hydrophobic and/or hydrophilic properties by adjusting the nature of groups $R_1$ to $R_5$. Such a control of the grafting is not possible with prior art methods, given that they do not enable to introduce at the same time the two types of hydrophobic and hydrophilic functionalities.

Further, when the group having formula (II) comprises a hydrophobic substituent $R^i$ (i=1 to 5) and a hydrophilic substituent $R^{i'}$ (i'=1 to 5, i'≠i), the distribution of the hydrophilic and hydrophobic properties is homogeneous given that the method enables to simultaneously graft them.

The grafted carbon substrate may in particular be used in a fuel cell, for example as a gas diffusion layer.

It is advantageously implemented in an electrolyte membrane fuel cell, and particularly with a PEMFC-type proton exchange membrane.

The present invention relates to a gas diffusion layer made of the carbon substrate capable of being obtained by the above-described method. It also relates to a fuel cell comprising at least one gas diffusion layer of this type.

The carbon substrate according to the invention may also be used in an accumulator, but also in electrolysis or catalysis.

The invention and the resulting advantages will better appear from the following non-limiting drawings and examples, provided as an illustration of the invention.

DETAILED DESCRIPTION OF THE INVENTION

Four gas diffusion layers (GDL) have been prepared. These are counter-examples (CE-1 to CE-3) and a GDL according to the present invention (INV-1). The GDLs have been prepared and tested in a button cell configuration.

TABLE 1

Characteristics of the studied GDLs

| Example | GDL[a] | hydrophobic treatment | grafted molecule |
|---|---|---|---|
| CE-1 | carbon | — | — |
| CE-2 | carbon | (b) | — |
| CE-3 | carbon | (c) | 1-CF$_3$ |
| INV-1 | carbon | (d) | 2-CF$_3$ |

[a] carbon nonwoven (SGL reference GDL 24AA, material with no hydrophobic treatment)
(b) hydrophobic treatment obtained by deposition (immersion and then sintering) of PTFE (polytetrafluoroethylene), the commercial reference being: SGL's GDL 24BA comprising 5 wt. % of PTFE.
(c) grafting with 1-CF$_3$ (4-(trifluoromethyl)phenyl))
(e) grafting with 2-CF$_3$ (3,5-bis(trifluoromethyl)phenyl))

1) Preparation of the GDL According to the Invention (INV-1)

A carbon nonwoven is grafted with a hydrophobic group of type 2-CF$_3$ (INV-1).

The grafting comprises the steps of:
following a diazonium salt by addition of an excess of oxidizing agent (NaNO$_2$, 4 mM, in excess with respect to the amine) in an aqueous solution of hydrochloric acid (0.5 M) and of amine (2 mM), the amine being 3,5-bis(trifluoromethyl)aniline (CAS number: 328-74-5).
electrochemically reducing the diazonium salt in the presence of a carbon nonwoven. At least 50 cycles of linear variations of a potential from 0.2 V to −1.0 v vs Hg/Hg$_2$SO$_4$ have been carried out. In such conditions, a larger number of cycles changes nothing to the grafting method.
obtaining a hydrophobic grafted GDL.

2) Detection of the Grafting by Cyclovoltammetry

The grafting is characterized by cyclic voltammetry of the grafted GDL (CE-3 and INV-1) in the presence of the ferrocyanide/ferricyanide redox couple ([Fe(CN)$_6$]$^{4-}$/[Fe(CN)$_6$]$^{3-}$) which is very sensitive to the surface condition of the studied material.

Figure 1:
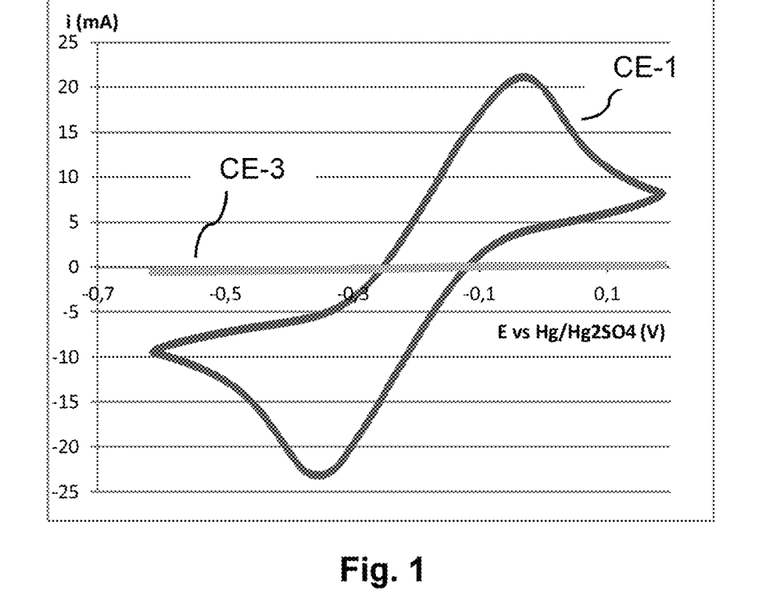
FIG. 1 corresponds to the cyclic voltammogram obtained for a carbon nonwoven before and after a hydrophobic grafting.

FIG. 1 shows the results obtained before the grafting (CE-1) and after the grafting (CE-3). It is a cyclic voltammogram obtained at 50 mV/s in the presence of the [Fe(CN)$_6$]$^{4-}$/[Fe(CN)$_6$]$^{3-}$ couple.

Before the grafting, the redox peaks of the ferrocyanide/ferricyanide couple are effectively present (CE-1).

After the grafting (CE-3), the redox peaks of the ferrocyanide/ferricyanide couple are no longer visible. Indeed, the grafted species generate a resistance to charge transfer for the [Fe(CN)$_6$]$^{4-}$/[Fe(CN)$_6$]$^{3-}$ couple, which confirms the grafting of the hydrophobic group of type 1-CF$_3$.

3) XPS Characterization

X-ray photoelectronic spectroscopy (XPS) is a non-destructive technique applied to the extreme surface (analysis depth ~5 nm) which enables to test the electronic structure and the chemical modifications at the GDL surface after grafting.

Figure 2:
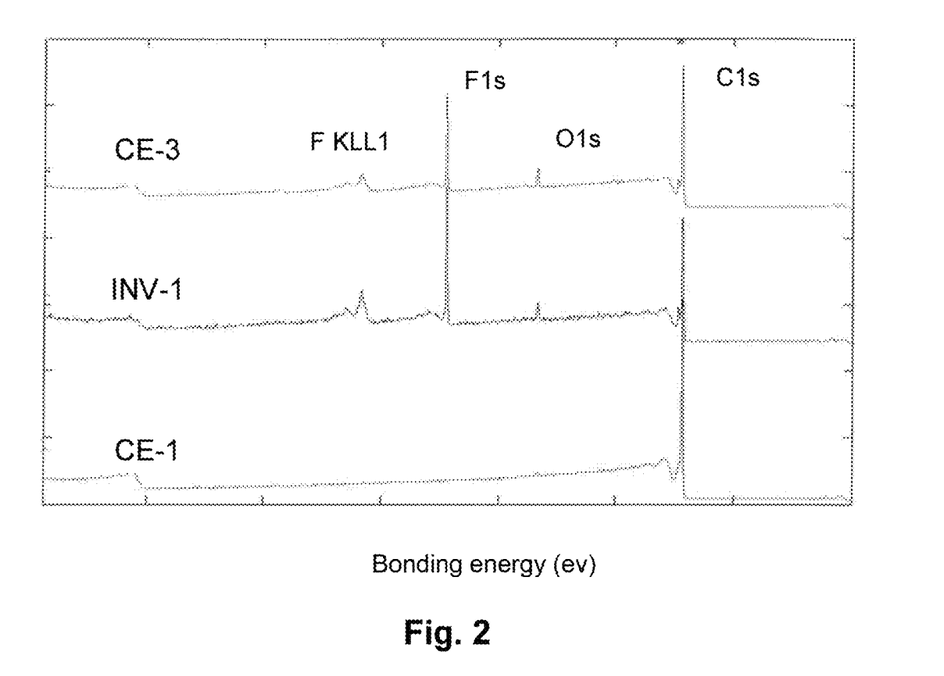
FIG. 2 corresponds to the XPS spectrums of a carbon substrate before and after the grafting.
Figure 3:
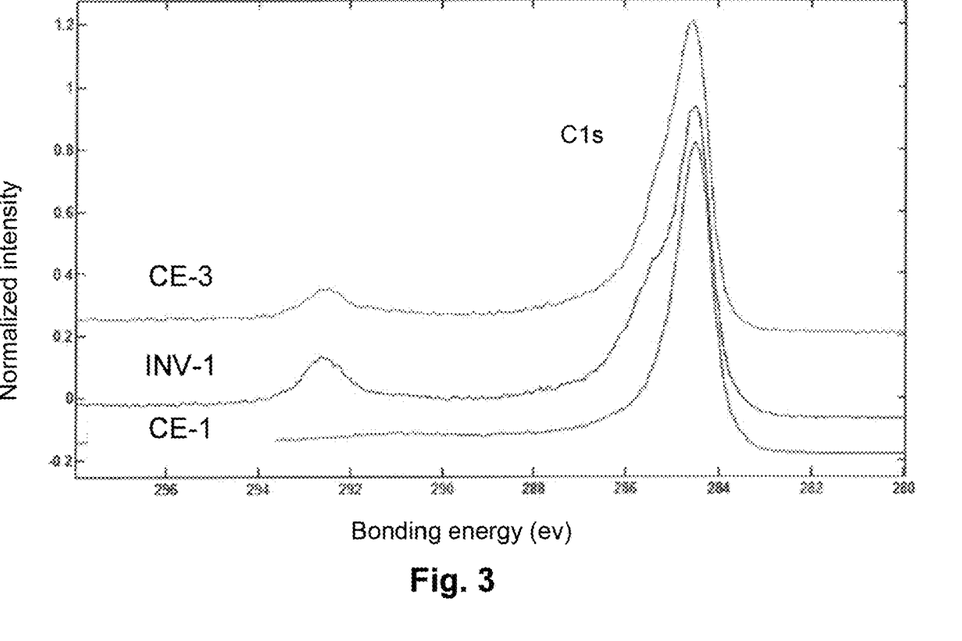
FIG. 3 corresponds to an enlarged view of region C1s of the XPS spectrums of a carbon substrate before and after a grafting.

The general spectrum recorded after the grafting of the diazonium salts of compounds 1-CF$_3$ and 2-CF$_3$ on gas diffusion layers (GDL) indicates the presence of fluorinated groups (FIGS. 2 and 3).

Figure 4:
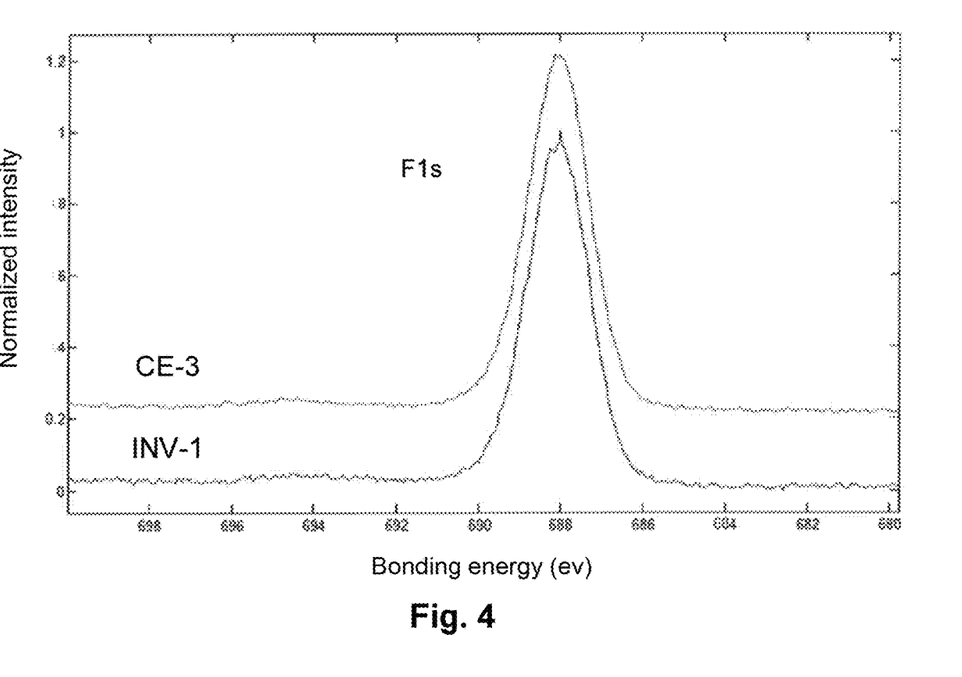
FIG. 4 corresponds to an enlarged view of region F1s of the XPS spectrums of a carbon substrate after a grafting.

The high-resolution analysis of core peaks C1s, F1s and O1s provides information relative to the efficiency of the grafting method (FIGS. 2 to 4).

Before the grafting, the GDL is similar to graphite-type carbon, with a strong presence of sp2-hybridized carbon atoms and (π-π*) plasmonic oscillation peaks.

After the grafting, core peak C1s indicates the appearing of a new peak towards high bonding energies (292.45 eV) attributed to carbon atoms bonded to three fluorine atoms.

The further presence of peaks C1s with a sp2 hybridization and of the (π-π*) plasmonic bands indicates that the grafting has effectively occurred. This result is confirmed by the detection of peak F1s at 688.0 eV which is the signature of fluorine and -Ph-CF$_3$ bond.

Core peak C1s also shows that the surface of the GDLs is functionalized by other C—OH, —COO, and -Ph-CH$_2$ groups.

The presence of —OH, —OOH groups would induce a hydrophilic character at the surface of the carbon GDLs.

XPS spectroscopy also enables to follow the hydrophobic/hydrophilic character of the samples by quantizing the atomic percentage of the C—F/C—O, —COO at the surface of the GDL after grafting.

4) Cell Tests

Two membrane/electrode assemblies (MEA) have been prepared by hot pressing of two GDLs (while adding a microporous layer and a catalytic layer common to all MEAs) on each side of a Nafion® proton-exchange membrane. The pressing step enables to provide a good connection between surfaces and a good cohesion between the GDL and the membrane.

Figure 6:
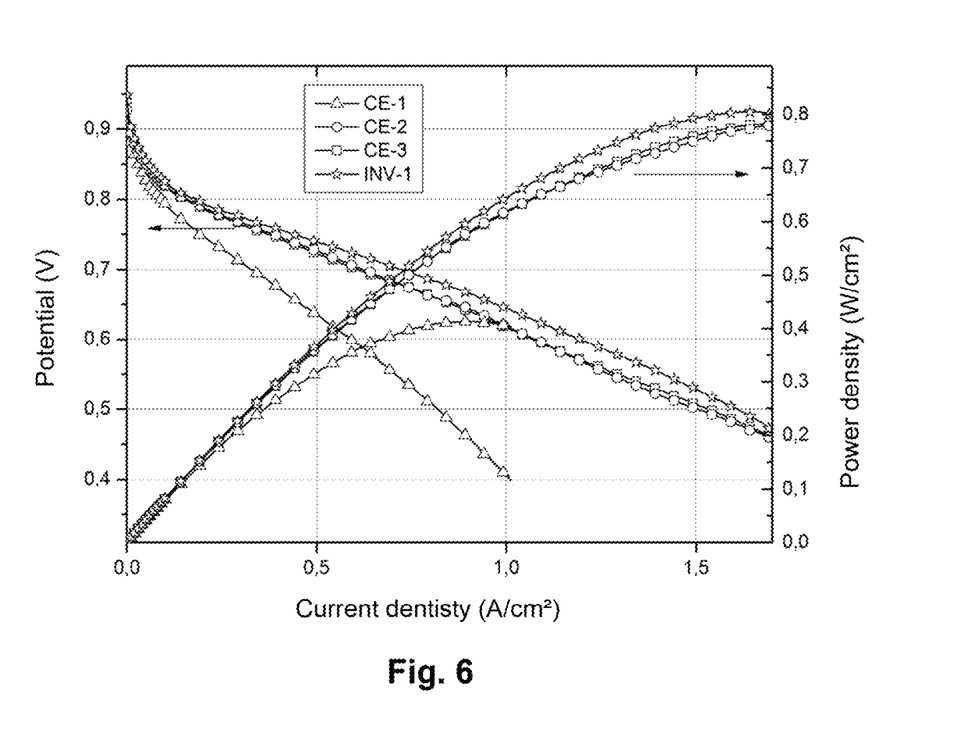
FIG. 6 corresponds to the curves of polarization at 80° C. and 50% of relative humidity of a carbon substrate before and after a grafting according to the present invention.
Figure 7:
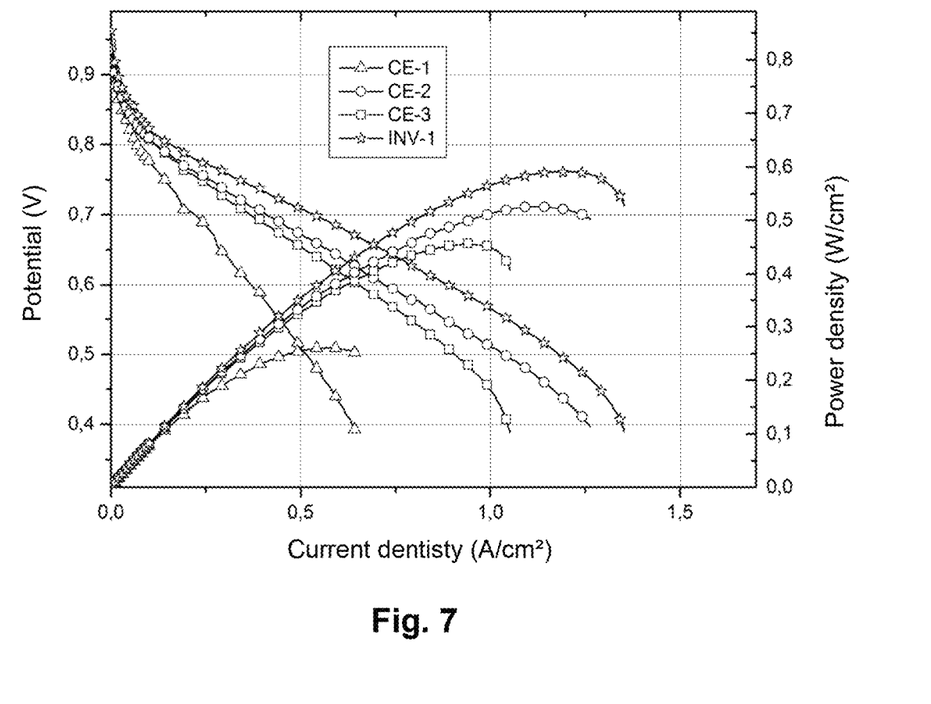
FIG. 7 corresponds to the curves of polarization at 80° C. and 20% of relative humidity of a carbon substrate before and after a grafting according to the present invention.

Three types of conditions have been tested to detect the hydrophobic character of GDLs:
humid conditions; 60° C. and 100% RH (relative humidity) (FIG. 5);
automobile conditions: 80° C. and 50% RH (FIG. 6): and conditions 80° C.+20% RH (FIG. 7).

Figure 5:
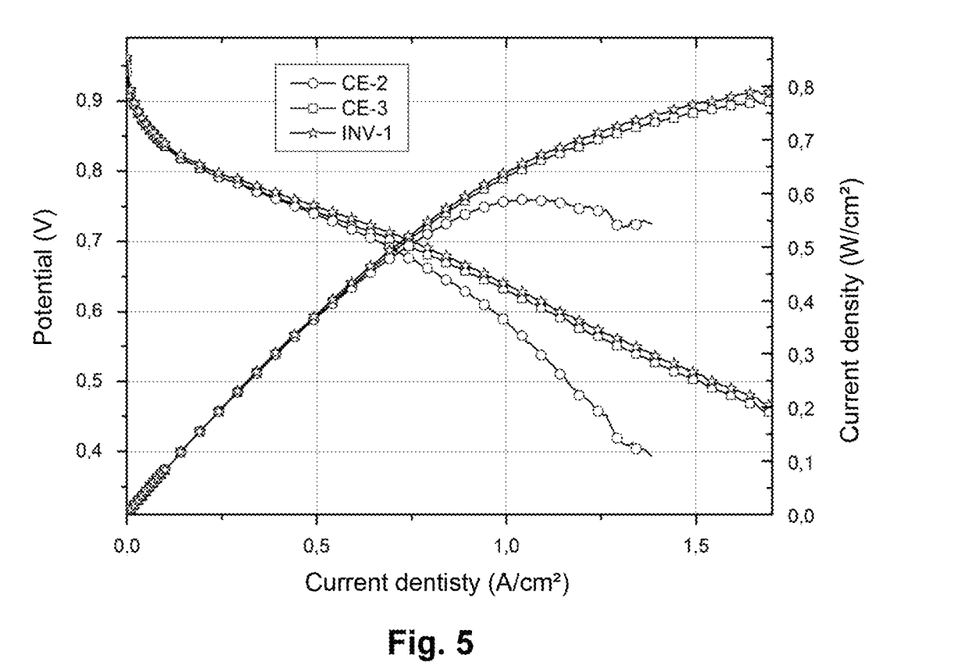
FIG. 5 corresponds to the curves of polarization at 60° C. and 100% of relative humidity of a carbon substrate before and after a grafting according to the present invention.

FIG. 5 shows that the performance corresponding to the grafted GDL (INV-1) is greater than that of the hydrophobically-treated GDL CE-2.

Further, no limitation to mass transport can be observed, which indicates that there is no drowning in the cell, particularly at the cathode.

FIG. 5 also shows that the performance corresponding to grafted GDLs (CE-3 and INV-1) are better than those of a GDL having been submitted to a hydrophobic treatment (CE-2). Further, the performance of the grafted GDL according to the invention (INV-1) is better than that of the GDL grafted with a monosubstituted compound (CE-3). The performance of GDL CE-1 is not shown since it is too low.

FIG. 6 shows that the performance corresponding to the GDL grafted with a bisubstituted compound (INV-1) is better than all others.

More generally, FIG. 7 shows that the performance of the tested GDLs may be classified in the following order: INV-1>CE-3>CE-2>CE-1.

The less advantageous results relate to the GDL having been submitted to no hydrophobic treatment (CE-1). A PTFE-type hydrophobic treatment enables to improve the performance (CE-2). However, the best results relates to GDLs grafted with a mono-(CE-3) or bisubstituted (INV-1) compound.

Surprisingly, the Applicant has observed that the presence of two substituents enables to improve the performance of the GDL even though such modifications may generate other problems such as an increase of steric constraints.

Further, the presence of two substituents may enable to simultaneously introduce hydrophobic and hydrophilic properties.

The invention claimed is:

1. A gas diffusion layer for a fuel cell, made of a carbon substrate grafted with at least one aromatic group having formula (II):

(II)

wherein the asterisk * designates a carbon atom with no hydrogen and no $R^i$ group, with i=1 to 5, and covalently bonded to the carbon substrate, wherein at least two of the $R^1$, $R^2$, $R^3$, $R^4$, and $R^5$ groups are different from a hydrogen atom, and wherein the $R^1$, $R^2$, $R^3$, $R^4$, and $R^5$ groups are selected independently from one another from the group consisting of $C(=O)O^-Y^+$, $SO_3^-Y^+$, $CH_2-SO_3^-Y^+$, $NR_3^+X^-$, OH, $PO_3H^-Y^+$, H, F, $C_nF_{2n+1}$, $C_nH_{2n+1}$, $NO_2$, $-O-CH_2-O-$, imidazole groups, and derivatives of imidazole groups, wherein Y=H, Na, K, Li, $NR'_4$, wherein X=F, Cl, Br, I, wherein n is an integer in range of 1 to 10, wherein $R=C_mH_{2m+1}$, wherein R'=H, $C_mH_{2m+1}$ and mixtures thereof, and wherein m is an integer in a range of 1 to 10.

2. The gas diffusion layer of claim 1, wherein the $R^1$, $R^2$, $R^3$, $R^4$ and $R^5$ groups correspond to one of the following combinations:

$R^1=R^3=R^5=H$ and $R^2=R^4=CF_3$;

$R^1=R^4=R^5=H$ and $R^2=R^3=-O-CH_2-O-$;

$R^1=R^3=R^5=H$;

$R^2=CF_3$ and $R^4=C(=O)O^-Y^+$;

$R^1=R^3=R^5=H$;

$R^1=SO_3^-Y^+$; and $R^4=CF_3$.

3. The gas diffusion layer of claim 1, wherein the carbon substrate is a material selected from the group consisting of carbon nonwoven, carbon fabric, carbon felt, carbon cloth, carbon paper, and graphite, carbon black, carbon nanotubes, and graphene.

4. The gas diffusion layer of claim 1, wherein the carbon substrate has a thickness in the range from 100 to 500 micrometers.

5. The gas diffusion layer of claim 1, wherein the gas diffusion layer is obtained by contacting a carbon substrate with a solution of diazonium salt having the following formula (I), and then by reducing the diazonium salt having the formula (I);

(I)

6. The gas diffusion layer of claim 5, wherein the carbon substrate is oxidized prior to contacting the diazonium salt solution.

7. The gas diffusion layer of claim 5, wherein the diazonium salt is reduced electrochemically by electrochemical generation of an electron by a diazonium salt molecule, or chemically.

8. The gas diffusion layer of claim 5, wherein contacting the carbon substrate with the solution of diazonium salt comprises:

grafting a first main surface of the substrate with a first solution of a first diazonium salt having the formula (I); and then grafting a second main surface of the carbon substrate with a second solution of a second diazonium salt having the formula (I), wherein the first and the second diazonium salts are different from each other.

9. A fuel cell comprising at least one gas diffusion layer of claim 1.

* * * * *